United States Patent
Yoo et al.

(10) Patent No.: US 12,283,721 B2
(45) Date of Patent: Apr. 22, 2025

(54) BATTERY CELL, BATTERY MODULE AND VEHICLE

(71) Applicant: LG Energy Solution, Ltd., Seoul (KR)

(72) Inventors: In-Sun Yoo, Daejeon (KR); Sang-Ho Park, Daejeon (KR); Do-Hyeon Kim, Daejeon (KR); Young-Soo Oh, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 17/668,741

(22) Filed: Feb. 10, 2022

(65) Prior Publication Data
US 2022/0263204 A1 Aug. 18, 2022

(30) Foreign Application Priority Data

Feb. 17, 2021 (KR) ........................ 10-2021-0021423

(51) Int. Cl.
*H01M 50/105* (2021.01)
*H01M 50/54* (2021.01)

(52) U.S. Cl.
CPC ......... *H01M 50/54* (2021.01); *H01M 50/105* (2021.01); *H01M 2220/20* (2013.01)

(58) Field of Classification Search
CPC .......................... H01M 50/178; H01M 50/186
See application file for complete search history.

(56) References Cited

U.S. PATENT DOCUMENTS

| 2004/0043289 A1* | 3/2004 | Shimamura | H01M 50/562 429/153 |
| 2011/0064974 A1* | 3/2011 | Heo | H01M 50/236 429/7 |
| 2011/0129711 A1* | 6/2011 | Ahn | H01M 50/124 429/94 |
| 2012/0288746 A1* | 11/2012 | Abe | H01M 10/0413 29/623.2 |

(Continued)

FOREIGN PATENT DOCUMENTS

| JP | 3260323 B2 | 2/2002 |
| JP | 3695435 B2 | 9/2005 |

(Continued)

OTHER PUBLICATIONS

Perforation noun—Definition, pictures, pronunciation and usage notes | Oxford Advanced Learner's Dictionary at OxfordLearnersDictionaries.com. (n.d.). https://www.oxfordlearnersdictionaries.com/us/definition/english/perforation (Year: 2023).*

*Primary Examiner* — Matthew T Martin
*Assistant Examiner* — Grace Ann Kenlaw
(74) *Attorney, Agent, or Firm* — Lerner David LLP

(57) ABSTRACT

Disclosed herein is a battery cell with improved durability and safety for the swelling phenomenon. The battery cell can include an electrode assembly having an electrode tab, an electrode lead electrically connected to the electrode tab, a pouch case configured to accommodate the electrode assembly therein and having at least one perforation hole formed in a portion thereof, and a lead film configured to have a (Continued)

portion interposed between the electrode lead and an inner surface of the pouch case and having at least one insert protrusion formed on an outer surface thereof to be inserted into the perforation hole.

10 Claims, 7 Drawing Sheets

(56) References Cited

U.S. PATENT DOCUMENTS

2013/0189570 A1\* 7/2013 Park .................. H01M 50/126
                                                              429/185
2014/0011060 A1   1/2014 Yang et al.

FOREIGN PATENT DOCUMENTS

| JP | 4103488 B2 | 6/2008 |
| KR | 101045858 B1 | 7/2011 |
| KR | 101250901 B1 | 4/2013 |
| KR | 101370265 B1 | 3/2014 |
| KR | 101879869 B1 | 7/2018 |

\* cited by examiner

BATTERY CELL, BATTERY MODULE AND VEHICLE

CROSS-REFERENCE TO RELATED APPLICATIONS

The present application claims priority to Korean Patent Application No. 10-2021-0021423 filed on Feb. 17, 2021, in the Republic of Korea, the disclosure of which is incorporated herein by reference in its entirety.

TECHNICAL FIELD

The present disclosure relates to a battery cell, a battery module, and a vehicle, and more specifically, the present disclosure relates to a battery cell with improved durability and safety for a swelling phenomenon, and a battery module including the battery cell, and a vehicle.

BACKGROUND ART

Unlike primary batteries that cannot be normally charged, secondary batteries that can be charged and discharged have been actively studied along with the development in high-tech fields such as digital cameras, cellular phones, laptop computers, power tools, electric bicycles, electric vehicles, hybrid electric vehicles, large-capacity energy storage systems, and the like.

A secondary battery that can be charged and discharged multiple times has an operating voltage of 3.6V or higher and is used as a power source for a portable electronic device. Alternatively, a plurality of secondary batteries may be connected in series or in parallel and used for electric vehicles, hybrid electric vehicles, power tools, electric bicycles, energy storage systems, UPS, or the like with high output.

For example, a secondary battery using lithium as an active material may be classified into a lithium ion battery using a liquid electrolyte and a lithium ion polymer battery using a solid polymer electrolyte depending on the type of electrolyte. At this time, in the case of lithium ion batteries using a liquid electrolyte, a cylindrical or rectangular metal can is usually used in a hermetically sealed form by welding. A can-type secondary battery using such a metal can as a container has a fixed shape, so there is a disadvantage in restricting the design of an electric product using the secondary battery as a power source, and there is a difficulty in reducing the volume. Therefore, in order to solve these disadvantages, a pouch-type secondary battery where an electrode assembly and an electrolyte are put into a pouch case made of film to be sealed has been developed and used.

Such a pouch-type secondary battery includes a pouch case and an electrode assembly as a basic structure. The electrode assembly has a structure in which unit cells, each including a negative electrode plate, a separator and a positive electrode plate, are repeatedly stacked. Each unit cell includes a positive electrode tab and a negative electrode tab. The positive electrode tab and the negative electrode tab are converged in a certain direction and then bonded to ends of a positive electrode lead and a negative electrode lead to which a lead film is added, respectively, by methods such as resistance welding, ultrasonic welding and laser welding. These electrode leads perform a function of electrically connecting the secondary battery and an external device with each other.

In addition, after the electrode assembly is mounted in an inner space defined by the pouch case, it is manufactured into a secondary battery through the process of thermally fusing and sealing the periphery of the pouch case except for an electrolyte injection portion, the process of injecting an electrolyte through the electrolyte injection portion, the process of thermally fusing the electrolyte injection portion to completely seal the pouch case, the process of cutting unnecessary remaining parts of the electrolyte injection portion, the process of aging the secondary battery, and the process of performing post-treatment such as initial charging and testing.

However, as shown in FIGS. 1 and 2, in a lithium secondary battery 10, a swelling phenomenon in which gas increases inside a pouch case 50 may occur due to frequent charging/discharging and overheating. This swelling phenomenon is accumulated or promoted, and the pressure inside the pouch case is increased by a predetermined level or more by the generated gas, and eventually the sealing of the thermally fused portion (sealing portion) of the pouch case of the secondary battery is released, which may cause an accident of leaking the gas and electrolyte inside the pouch case to the outside. Accordingly, it is one of the important tasks to secure the durability and safety of the secondary battery against the swelling phenomenon.

DISCLOSURE

Technical Problem

The present disclosure is designed to solve the problems of the related art, and therefore the present disclosure is directed to providing a battery cell with improved durability and safety for the swelling phenomenon, and a battery module including the battery cell, and a vehicle.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery cell, comprising:
an electrode assembly having an electrode tab;
an electrode lead electrically connected to the electrode tab;
a pouch case configured to accommodate the electrode assembly therein and having at least one perforation hole formed in a portion thereof; and
a lead film configured to have a portion interposed between the electrode lead and an inner surface of the pouch case and having at least one insert protrusion formed on an outer surface thereof to be inserted into the perforation hole.

Also, a portion of the insert protrusion protruding to the outside from the perforation hole may be bonded to an outer surface of the pouch case.

Moreover, each of the perforation hole and the insert protrusion may be provided in the number of two or more, and
the portion of the insert protrusion protruding to the outside through the perforation hole may be connected to a portion of another insert protrusion.

In addition, a fixing protrusion protruding toward the lead film may be formed on the inner surface of the pouch case, and the lead film may have a fixing hole formed therein so that the fixing protrusion is inserted.

Moreover, the fixing protrusion may be bonded to an inner surface of the fixing hole.

In addition, the battery cell may further comprise a fixing tape located on an outer surface of the pouch case and having an adhesive layer formed on one surface thereof that faces the pouch case, the fixing tape being configured to fix the insert protrusion.

Also, the fixing tape may have at least one coupling hole configured such that a protruding end of the insert protrusion is inserted therein.

Moreover, the protruding end of the insert protrusion may be bonded to an outer surface of the fixing tape.

In another aspect of the present disclosure, there is also provided a battery module, comprising at least one battery cell as described above.

In another aspect of the present disclosure, there is also provided a vehicle, comprising at least one battery cell as described above.

Advantageous Effects

According to an embodiment of the present disclosure, since at least one insert protrusion configured to be inserted into the perforation hole of the pouch case is formed on the lead film, even though the amount of internal gas increases due to the swelling phenomenon, the sealed state is not easily released due to the coupling structure of the insert protrusion and the perforation hole, thereby delaying the time during which the gas is discharged to the outside, compared with the conventional battery cell. Accordingly, the battery cell of the present disclosure may be improved in durability and safety.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
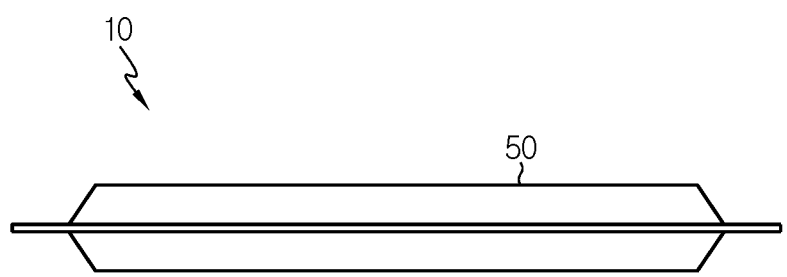
FIGS. 1 and 2 are side views schematically showing swelling of a conventional secondary battery.
Figure 2:
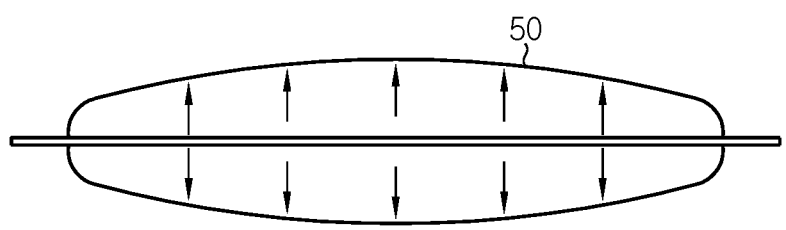
Figure 3:
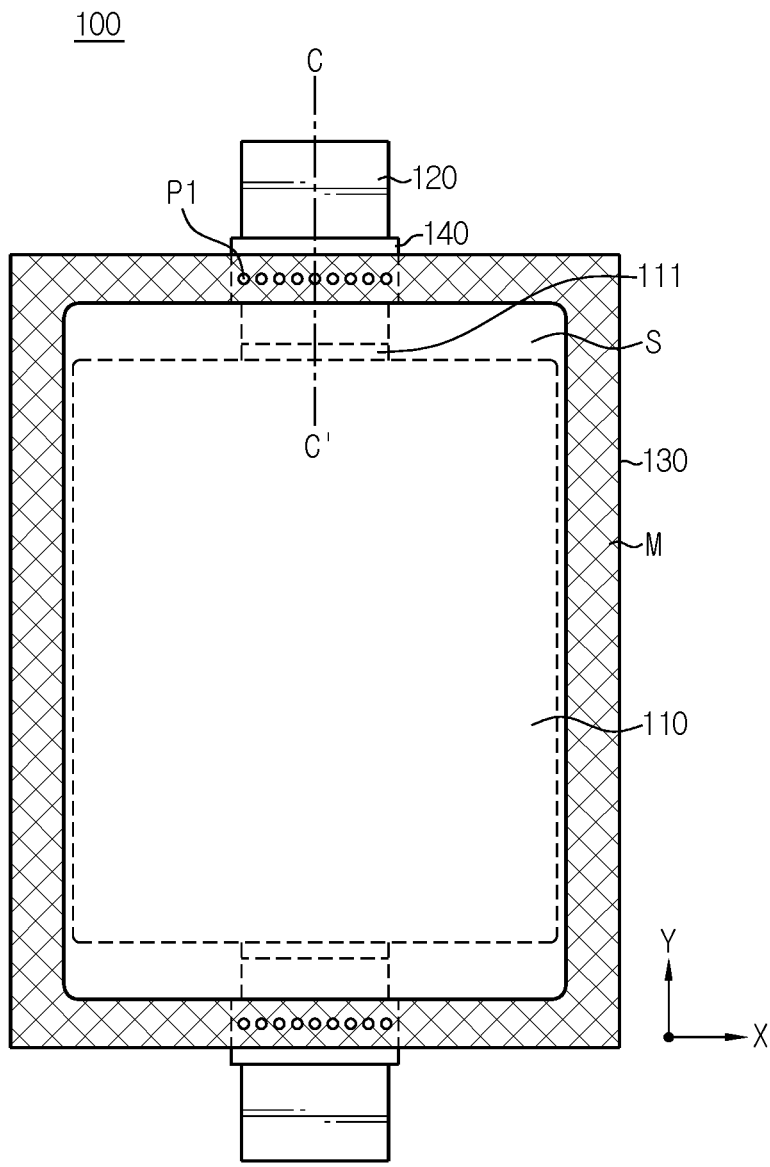
FIG. 3 is a plan view schematically showing a battery cell according to an embodiment of the present disclosure.
Figure 4:
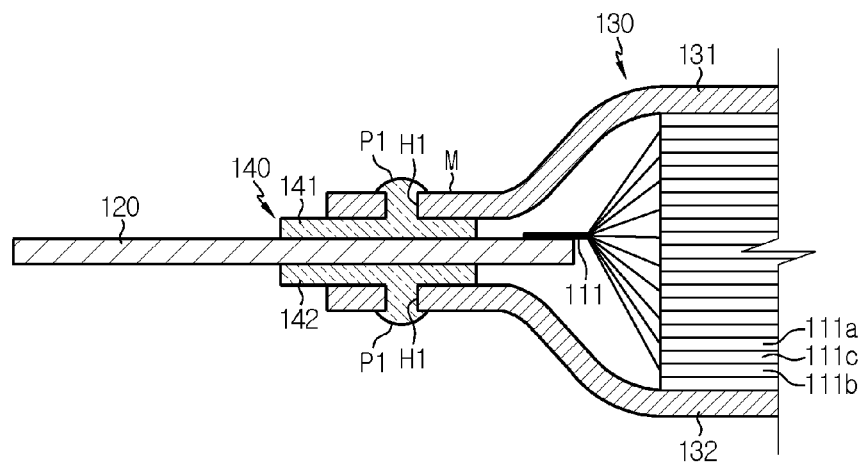
FIG. 4 is a partial sectional view schematically showing a battery cell according to an embodiment of the present disclosure.
Figure 5:
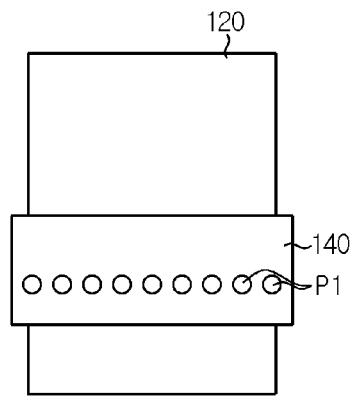
FIG. 5 is a plan view schematically showing an electrode lead and a lead film of the battery cell according to an embodiment of the present disclosure.
Figure 6:
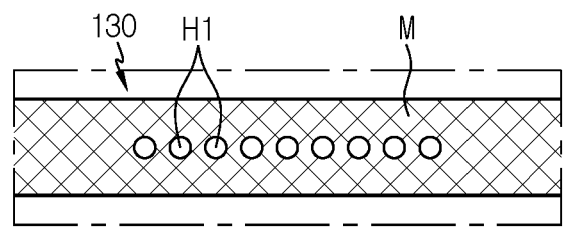
FIG. 6 is a partial plan view schematically showing a partial configuration of a pouch case of the battery cell according to an embodiment of the present disclosure.

FIG. 3 is a plan view schematically showing a battery cell according to an embodiment of the present disclosure. FIG. 4 is a partially sectioned view schematically showing the battery cell according to an embodiment of the present disclosure. FIG. 5 is a plan view schematically showing an electrode lead and a lead film of the battery cell according to an embodiment of the present disclosure. Also, FIG. 6 is a partial plan view schematically showing a partial configuration of a pouch case of the battery cell according to an embodiment of the present disclosure. For reference, a battery cell 100 of FIG. 5 is in a state of being placed on the ground. In addition, the X-axis direction and the Y-axis direction of FIG. 3 mean a left and right direction and a front and rear direction.

Referring to FIGS. 3 to 6, the battery cell 100 according to an embodiment of the present disclosure includes an electrode assembly 110, an electrode lead 120, a pouch case 130, and a lead film 140.

Specifically, the electrode assembly 110 includes a positive electrode plate 111a, a negative electrode plate 111b, a separator 111c, and an electrode tab 111. The electrode assembly 110 may be a stack-type electrode assembly 110 formed by interposing a separator 111c between a positive electrode plate 111a and a negative electrode plate 111b stacked on each other. Although the drawings of the present disclosure show only a case where the electrode assembly 110 is a stacked type, it is also possible that the electrode assembly 110 is formed in a jelly-roll type. The positive electrode plate 111a is formed by coating a positive electrode active material on a current collector plate made of aluminum (Al) material, and the negative electrode plate 111b is formed by coating a negative electrode active material on a current collector plate made of copper (Cu) material.

The electrode tab 111 is integrally formed with the electrode plates 111a, 111b and corresponds to an uncoated region of the electrode plates 111a, 111b not coated with an electrode active material. That is, the electrode tab 111 includes a positive electrode tab corresponding to an area of the positive electrode plate 111a not coated with a positive electrode active material and a negative electrode tab corresponding to an area of the negative electrode plate 111b not coated with a negative electrode active material.

The electrode lead 120 is a thin plate-shaped metal that is attached to the electrode tab 111 and extends in an outer direction of the electrode assembly 110. The metal may be, for example, an aluminum alloy or a copper alloy. The electrode lead 120 includes a positive electrode lead attached to the positive electrode tab and a negative electrode lead attached to the negative electrode tab. The electrode lead 120 may be electrically connected to the electrode tab 111. The positive electrode lead and the negative electrode lead may extend in the same direction or in opposite directions depending on the positions where the positive electrode tab and the negative electrode tab are formed. For example, an inner end of the electrode lead 120 may be welded to an end of the electrode tab 111. As shown in FIG. 3, the electrode lead 120 having a positive polarity and the electrode lead 120 having a negative polarity may be provided at both sides of the electrode assembly 110 based on the center.

In addition, the pouch case 130 may be configured to accommodate the electrode assembly 110 therein. The pouch case 130 may include an upper cover 131 and a lower cover 132 configured to form an accommodation space S that accommodates the electrode assembly 110. In detail, although not shown, the pouch case 130 may be a laminate sheet in which an inner sealant layer, a metal foil barrier layer and an outer insulation layer are sequentially laminated from the inside to the outside. For example, the inner sealant layer of the upper cover 131 of the pouch case 130 may be melted and bonded with the inner sealant layer of the lower cover 132 or the outer surface of the lead film 140.

In addition, the pouch case 130 may have at least one perforation hole H1 formed in a portion thereof. That is, the perforation hole H1 may be formed by perforating all of the inner sealant layer, the metal foil barrier layer, and the outer insulation layer. The perforation hole H1 may be formed in an outer circumference of the pouch case 130 corresponding to a sealing region. The perforation hole H1 may be formed in a portion facing the lead film 140.

Moreover, the lead film 140 may be configured to make electrical insulation between the electrode lead 120 and the pouch case 130. The lead film 140 may include, for example, polypropylene (PP). The lead film 140 may be configured to surround a portion of the outer surface of the electrode lead 120. For example, the lead film 140 may be configured to surround a portion of the upper surface of the electrode lead 120, a portion of both sides thereof, and a portion of the lower surface thereof, when the battery cell 100 is placed on the ground. For example, the lead film 140 may have a band shape elongated in a longitudinal direction, and may have a ring shape so that both ends thereof in the longitudinal direction are connected to each other. Alternatively, the lead film 140 may have two layers positioned to face each other, one surfaces of the two layers facing each other may be partially bonded to each other, and the remaining portion may be bonded to the outer surface of the electrode lead 120.

In addition, a portion of the lead film 140 may be interposed between the electrode lead 120 and the inner surface of the pouch case 130. For example, as shown in FIG. 4, the lead film 140 may include an upper portion 141 surrounding the upper surface of the electrode lead 120, and a lower portion 142 surrounding the lower surface of the electrode lead 120. Each of the upper portion 141 and the lower portion 142 of the lead film 140 may be interposed between the electrode lead 120 and the inner surface of the pouch case 130. That is, the upper surface of the upper portion 141 of the lead film 140 may face the inner surface (sealant layer) of the upper cover 131 of the pouch case 130. The lower surface of the lower portion 142 of the lead film 140 may face the inner surface (sealant layer) of the lower cover 132 of the pouch case 130.

Further, the lead film 140 may have at least one insert protrusion P1 formed in the outer surface thereof. The insert protrusion P1 may have a shape protruding toward the pouch case 130 to be inserted into the perforation hole H1. Also, the insert protrusion P1 may penetrate the perforation hole H1 so that a thereof protrudes to the outside from the perforation hole H1. For example, as shown in FIG. 3, when the perforation hole H1 has a cylindrical inner space, the insert protrusion P1 may have a cylindrical shape. That is, a portion of the insert protrusion P1 may have a shape corresponding to the inner space of the perforation hole H1.

Therefore, according to this configuration of the present disclosure, in the present disclosure, since at least one insert protrusion P1 configured to be inserted into the perforation hole H1 of the pouch case 130 is formed on the lead film 140, even though the amount of internal gas increases due to the swelling phenomenon, the sealed state (closed state) is not easily released due to the coupling structure of the insert protrusion P1 and the perforation hole H1, thereby delaying the time during which the gas is discharged to the outside, compared with the conventional battery cell 100. Accordingly, the battery cell 100 of the present disclosure may be improved in durability and safety.

Figure 7:
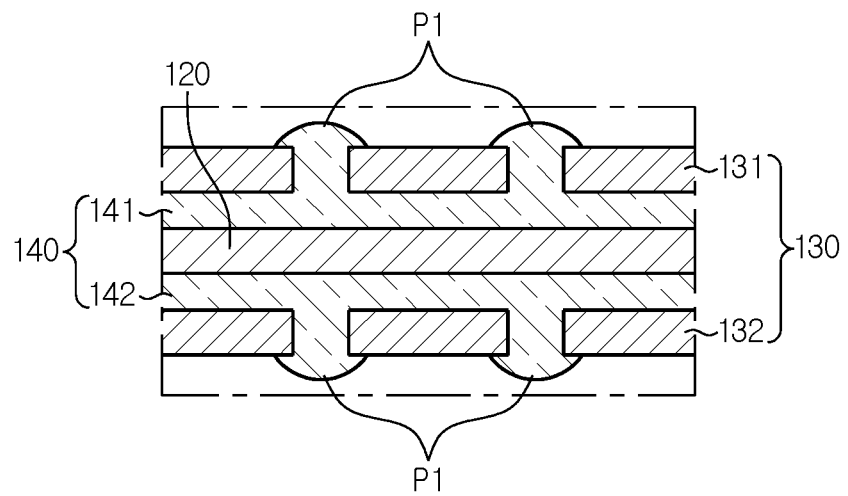
FIG. 7 is a partial sectional view schematically showing a partial configuration of the battery cell of FIG. 3 taken along a line C-C'.

FIG. 7 is a partially sectioned view schematically showing a partial configuration of the battery cell, taken along the line C-C' of FIG. 3.

Referring to FIGS. 3, 4, and 7 again, each of the upper portion 141 and the lower portion 142 of the lead film 140 may be thermally fused with a portion of the pouch case 130 to form a sealing portion M. As shown in FIG. 3, the outer circumference of the pouch case 130 is thermally compressed by a high-temperature press to be at least partially melted, and then harden again. Through this process, the outer circumference of the upper cover 131 and the outer circumference of the lower cover 132 may be bonded to each other, the upper portion 141 of the lead film 140 and the upper cover 131 may be bonded to each other, and the lower portion 142 of the lead film 140 and the lower cover 132 may be bonded to each other. During the thermal compression process, the insert protrusion P1 of the lead film 140 may be at least partially melted to be deformed, and then solidified again, so as to be bonded to the inner surface of the perforation hole H1 and the periphery of the outer side of the perforation hole H1.

Moreover, the portion of the insert protrusion P1 protruding to the outside from the perforation hole H1 may be bonded to the outer surface of the pouch case 130. For example, in the thermal compression process performed by the high-temperature press, an end of the insert protrusion P1 protruding from the perforation hole H1 may be melted and then solidified in a state of being compressed to the outer surface of the pouch case 130. That is, the end of the insert protrusion P1 may be thermally fused (melted and bonded) to the outer surface of the pouch case 130. At this time, the end of the insert protrusion P1 may have a horizontal sectional area larger than the diameter of the perforation hole H1. That is, the portion of the insert protrusion P1 protruding to the outside from the perforation hole H1 may be fused in a form of surrounding the outer circumference of the perforation hole H1.

Therefore, according to this configuration of the present disclosure, in the present disclosure, since a portion of the insert protrusion P1 protruding to the outside from the perforation hole H1 is bonded to the outer surface of the pouch case 130, the coupling force between the lead film 140 and the pouch case 130 may be effectively increased. That is, the lead film 140 of the present disclosure may be thermally fused with the inner surface of the pouch case 130 by thermal compression of a hot press, and moreover, at least a portion of the insert protrusion P1 may be thermally fused (melted and bonded) to the inner surface of the perforation hole H1 and the outer surface of the pouch case 130. Accordingly, in the present disclosure, the sealing force (coupling force) of the sealing portion M where the electrode lead 120 of the pouch case 130 is located may be effectively increased, thereby effectively compensating for the drawback that a portion of the sealing portion M where the electrode lead 120 is located has a relatively weak sealing force compared to other portions of the sealing portion M.

Ultimately, in the present disclosure, even though the amount of internal gas is increased due to the swelling phenomenon, the sealed state (closed state) is not easily released by means of the bonding structure between the insert protrusion P1 and the outer surface of the pouch case 130, and thus it is possible to delay the time during which the gas is discharged to the outside, compared to the conventional battery cell 100, thereby improving the durability and safety of the battery cell 100.

Meanwhile, referring to FIGS. 4 and 6 again, the battery cell 100 according to another embodiment of the present disclosure may include two or more perforation holes H1 and insert protrusions P1, respectively. For example, as shown in FIG. 5, nine insert protrusions P1 protruding upward may be formed on the upper portion 141 of the lead film 140. For example, as shown in FIG. 6, nine perforation holes H1 may be formed in the outer surface of the pouch case 130 by perforation. That is, in the battery cell 100 according to another embodiment of the present disclosure, two or more insert protrusions P1 may be inserted into two or more perforation holes H1, respectively.

Figure 8:
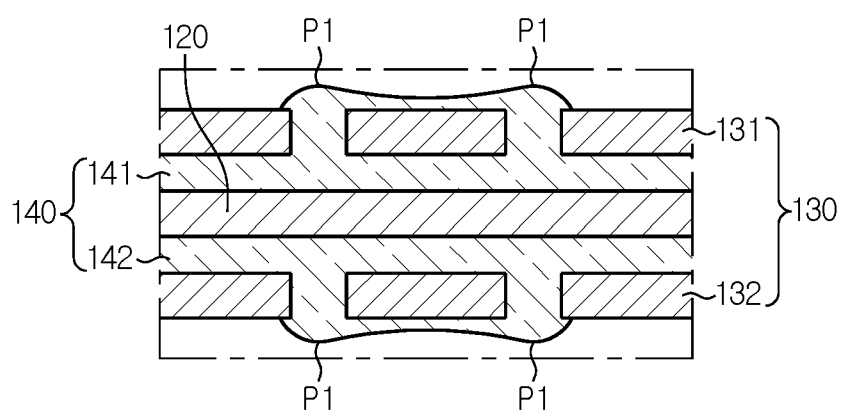
FIG. 8 is a partial sectional view schematically showing a partial configuration of a battery cell according to another embodiment of the present disclosure.

FIG. 8 is a partially sectioned view schematically showing a partial configuration of a battery cell according to another embodiment of the present disclosure.

Referring to FIG. 8, a portion of the insert protrusion P1 protruding to the outside through the perforation hole H1 may be connected to a portion of another insert protrusion P1. That is, the ends of two or more adjacent insert protrusions P1 may be melted during the thermal compression process, and the melted parts of the insert protrusions P1 may meet to be connected with each other on the outer surface of the pouch case 130 and then be hardened again. Through this process, the ends of the two or more insert protrusions P1 may be in the form of being connected to each other.

Therefore, according to this configuration of the present disclosure, in the present disclosure, since a portion of the insert protrusion P1 protruding to the outside through the perforation hole H1 has a form of being connected to a portion of another insert protrusion P1, the coupling force of the coupling structure of the insert protrusion P1 and the perforation hole H1 may be effectively increased. Accordingly, in the present disclosure, even though the amount of internal gas increases due to the swelling phenomenon, the sealed state (closed state) is not easily released by means of the bonding structure of the insert protrusion P1 and the perforation hole H1, thereby delaying the time during which the gas is discharged to the outside, compared to the conventional battery cell 100. Accordingly, the battery cell 100 of the present disclosure may be improved in durability and safety.

Figure 9:
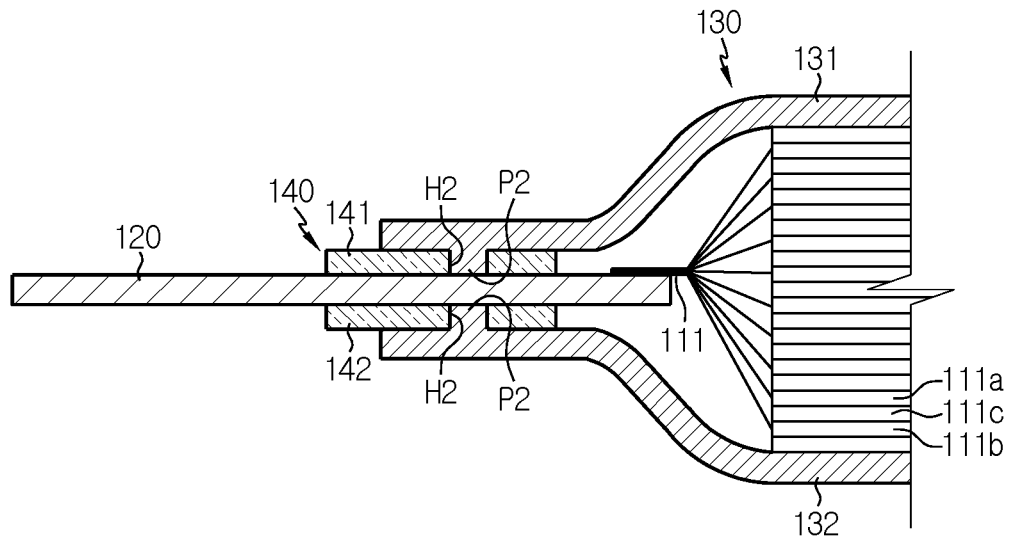
FIG. 9 is a partial sectional view schematically showing an inner configuration of a battery cell according to still another embodiment of the present disclosure.

FIG. 9 is a partially sectioned view schematically showing an inner configuration of a battery cell according to still another embodiment of the present disclosure. Also, FIG. 10 is a partially sectioned view schematically showing a partial configuration of the battery cell according to still another embodiment of the present disclosure.

Figure 10:
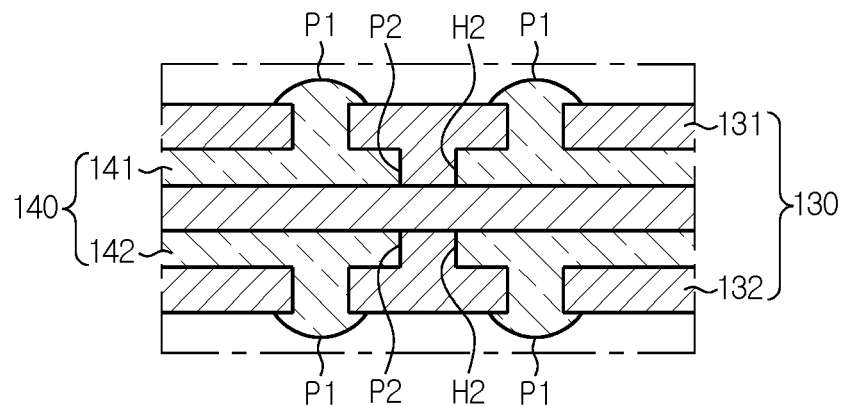
FIG. 10 is a partial sectional view schematically showing a partial configuration of the battery cell according to still another embodiment of the present disclosure.

Referring to FIGS. 9 and 10, compared with the battery cell 100 of FIG. 4, in the battery cell 100 of FIG. 9, at least one fixing protrusion P2 may be further formed on the pouch case 130, and at least one fixing hole H2 may be further formed in the lead film 140. Other features of the battery cell 100 of FIG. 9 may be the same as those of the battery cell 100 of FIG. 4.

Specifically, the fixing protrusion P2 may be formed on the inner surface of the pouch case 130. At this time, the fixing protrusion P2 may have a shape protruding toward the lead film 140. For example, as shown in FIG. 9, the fixing protrusion P2 protruding downward may be formed on the inner surface of the upper cover 131 of the pouch case 130. In addition, the fixing protrusion P2 protruding upward may be formed on the inner surface of the lower cover 132 of the pouch case 130. Although not shown in the drawings, a plurality of fixing protrusions P2 may be formed on the inner surface of each of the upper cover 131 and the lower cover 132 of the pouch case 130. The plurality of fixing protrusions P2 may be spaced apart from each other by a predetermined distance. Also, the fixing protrusion P2 may be positioned between two or more insert protrusions P1.

Further, the lead film 140 may have a fixing hole H2 configured so that the fixing protrusion P2 is inserted therein. The fixing hole H2 may be formed at a position facing the fixing protrusion P2. For example, as shown in FIG. 9, the fixing hole H2 into which the fixing protrusion P2 is inserted may be formed in each of the upper portion 141 and the lower portion 142 of the lead film 140. Although not shown in the drawings, a plurality of fixing holes H2 may be formed in each of the upper portion 141 and the lower portion 142 of the lead film 140. The plurality of fixing holes H2 may be spaced apart from each other by a predetermined distance. Also, the fixing hole H2 may be located between two or more insert protrusions P1. In addition, the fixing protrusion P2 may be bonded to the inner surface of the fixing hole H2. For example, in the thermal compression process, the fixing protrusion P2 may be thermally fused to the inner surface of the fixing hole H2.

Therefore, according to this configuration of the present disclosure, in the present disclosure, since the fixing protrusion P2 is further formed on the pouch case 130 and the fixing hole H2 is further formed in the lead film 140, even though the amount of internal gas increases due to the swelling phenomenon, the sealed state (closed state) is not easily released due to the coupling structure of the fixing protrusion P2 and the fixing hole H2 in addition to the coupling structure of the insert protrusion P1 and the perforation hole H1, thereby delaying the time during which the gas is discharged to the outside, compared with the conventional battery cell 100. Accordingly, the battery cell 100 of the present disclosure may be improved in durability and safety.

Figure 11:
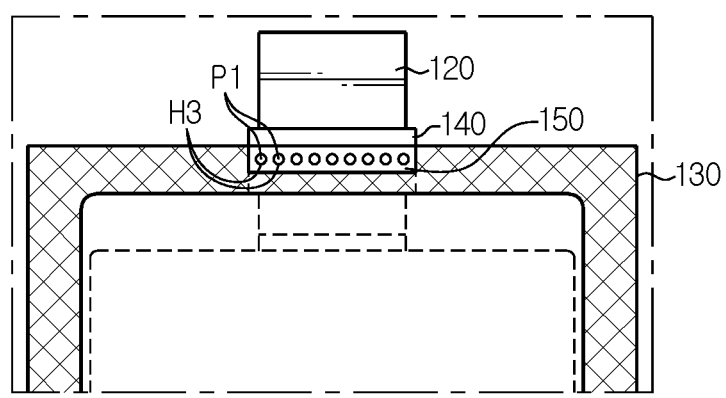
FIG. 11 is a partial plan view schematically showing a partial configuration of a battery cell according to further another embodiment of the present disclosure.

FIG. 11 is a partial plan view schematically showing a partial configuration of a battery cell according to further another embodiment of the present disclosure. Also, FIG. 12 is a partially sectioned view schematically showing a partial configuration of the battery cell according to further another embodiment of the present disclosure.

Figure 12:
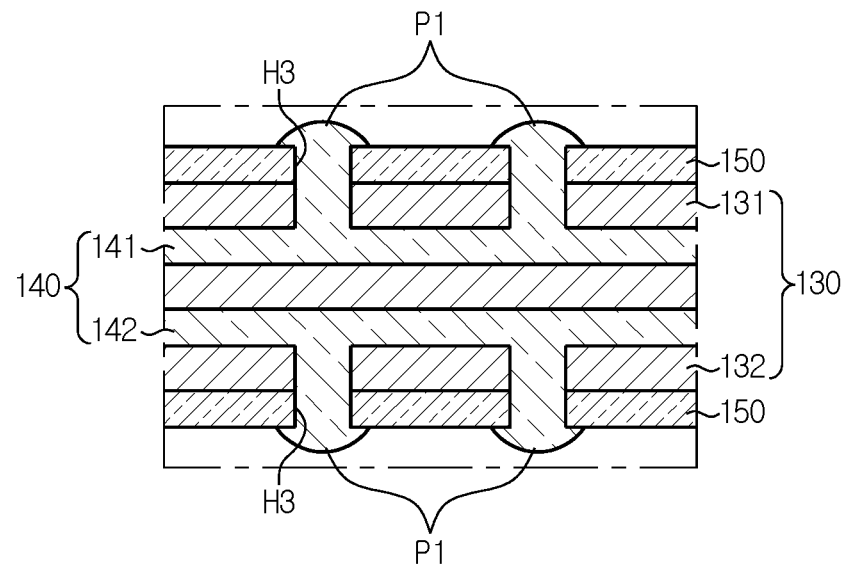
FIG. 12 is a partial sectional view schematically showing a partial configuration of the battery cell according to further another embodiment of the present disclosure.

Referring to FIGS. 11 and 12, the battery cell 100 according to another embodiment of the present disclosure may further include a fixing tape 150, compared with the battery cell 100 of FIG. 3. Other components of the battery cell 100 of FIG. 11 are the same as those of the battery cell 100 of FIG. 3.

Specifically, the fixing tape 150 may be configured to fix the end of the insert protrusion P1. The fixing tape 150 may be configured to fix the insert protrusion P1.

More specifically, the fixing tape 150 may be located on the outer surface of the pouch case 130. In the sealing portion M of the pouch case 130, the fixing tape 150 may be added at a position facing the lead film 140. The fixing tape 150 may have an adhesive layer formed on one surface thereof facing the pouch case 130. That is, the fixing tape 150 may be attached to the outer surface of the pouch case 130. For example, the fixing tape 150 may be added to the upper surface of the upper cover 131 of the pouch case 130 and the lower surface of the lower cover 132, respectively.

Therefore, according to this configuration of the present disclosure, since the present disclosure includes the fixing tape 150 additionally, it is possible to increase the fixing force of the insert protrusion P1 of the lead film 140 further. Accordingly, in the present disclosure, even though the amount of internal gas increases due to the swelling phenomenon, the sealed state (closed state) is not easily released, thereby delaying the time during which the gas is discharged to the outside, compared with the conventional battery cell 100. Accordingly, the battery cell 100 of the present disclosure may be improved in durability and safety.

Referring to FIGS. 11 and 12 again, the fixing tape 150 may have at least one coupling hole H3 formed therein. The coupling hole H3 may be configured such that the protruding end of the insert protrusion P1 is inserted. Moreover, a portion of the insert protrusion P1 protruding to the outside from the coupling hole H3 may be coupled to the outer surface of the fixing tape 150. For example, during the thermally compression process by the high-temperature press, the end of the insert protrusion P1 protruding from the coupling hole H3 is melted, and then solidified in a state of being compressed to the outer surface of the fixing tape 150. That is, the protruding end of the insert protrusion P1 may be melted and bonded to the outer surface of the fixing tape 150.

Therefore, according to this configuration of the present disclosure, in the present disclosure, since the coupling hole H3 configured so that the end of the insert protrusion P1 is inserted is formed in the fixing tape 150, the fixing force of the insert protrusion P1 of the lead film 140 may be further increased. Accordingly, in the present disclosure, even though the amount of internal gas increases due to the swelling phenomenon, the sealed state (closed state) is not easily released, thereby delaying the time during which the gas is discharged to the outside, compared with the conventional battery cell 100. Accordingly, the battery cell 100 of the present disclosure may be improved in durability and safety.

Figure 13:
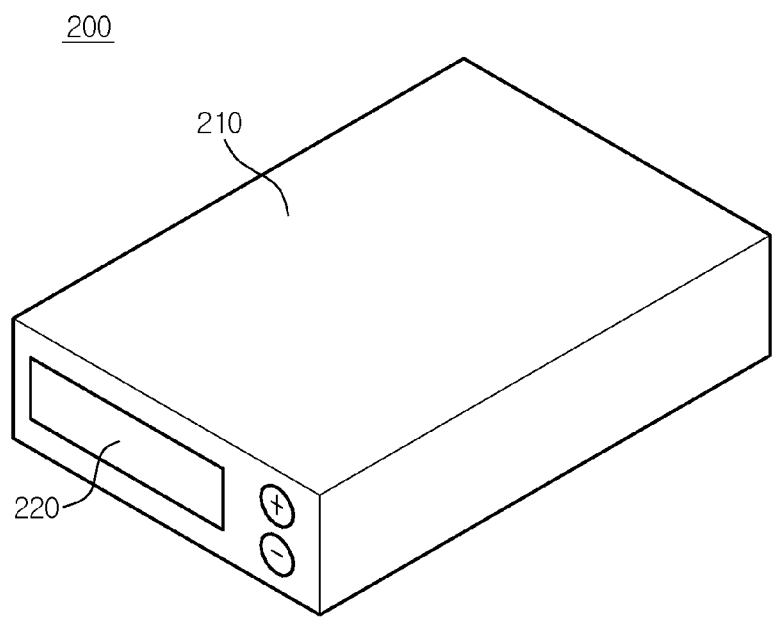
FIG. 13 is a perspective view schematically showing a battery module according to an embodiment of the present disclosure.

FIG. 13 is a perspective view schematically showing a battery module according to an embodiment of the present disclosure.

Referring to FIG. 13, the battery module 200 according to an embodiment of the present disclosure includes at least one battery cell 100 of FIG. 3. In addition, when a plurality of battery cells 100 are provided in the battery module, the battery module may include a bus bar for electrical connection thereof, a module housing 210 for accommodating the battery cells, and various devices 220 for controlling charging and discharging of the battery cells. The various devices 220 may include, for example, a battery management system (BMS), a current sensor, a fuse, and the like.

Figure 14:
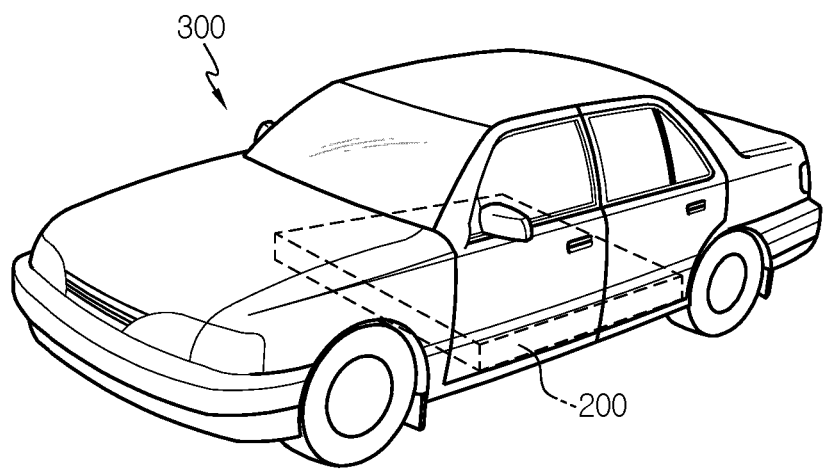
FIG. 14 is a perspective view schematically showing a vehicle according to an embodiment of the present disclosure.

FIG. 14 is a perspective view schematically showing a vehicle according to an embodiment of the present disclosure.

Referring to FIG. 14, the vehicle 300 according to an embodiment of the present disclosure includes at least one battery cell 100 of FIG. 3. For example, the vehicle may be an electric vehicle or a hybrid electric vehicle. For example, the vehicle according to an embodiment of the present disclosure may include the battery module 200 described above to be mounted inside a vehicle body.

Meanwhile, in this specification, terms indicating directions such as "upper", "lower", "left", "right", "front" and "rear" are used, but these terms are for convenience of explanation only, and it is obvious to those skilled in the art that these terms may vary depending on the location of an object or the location of an observer.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

| Reference Signs | |
| --- | --- |
| 100: battery cell | 110: electrode assembly |
| 111a: positive electrode plate | 111b: negative electrode plate |
| 111c: separator | |
| 111: electrode tab | 120: electrode lead |
| 130: pouch case | H1: perforation hole |
| 140: lead film | P1: insert protrusion |
| P2: fixing protrusion | H2: fixing hole |
| 150: fixing tape | H3: coupling hole |
| 200: battery module | |
| 300: vehicle | |

The invention claimed is:

1. A pouch-type battery cell, comprising:
an electrode assembly having an electrode tab;
an electrode lead electrically connected to the electrode tab;
a pouch case having at least one perforation hole, the electrode assembly being disposed within an upper portion and a lower portion of the pouch case, the upper portion and the lower portion of the pouch case contacting each other along a sealing portion;
a lead film having a portion thereof interposed between the electrode lead and an inner surface of the pouch case, the lead film including at least one insert protrusion extending from an outer surface thereof, the lead film extending along the electrode lead from the sealing portion to an outside of the pouch case, and
a fixing tape located on an outer surface of the sealing portion of the pouch case and having an adhesive layer formed on one surface thereof contacting the outer surface of the sealing portion and an opposite surface of the fixing tape facing outward, the insert protrusion being disposed in the perforation hole and extending through the fixing tape and away from an outer surface of the pouch case and the opposite surface of the fixing tape, wherein the fixing tape has at least one coupling hole configured to receive a protruding end of the insert protrusion.

2. The pouch-type battery cell according to claim 1, wherein a first portion of the insert protrusion protrudes from the perforation hole, the first portion being bonded to the outer surface of the pouch case.

3. The pouch-type battery cell according to claim 2, wherein the at least one perforation hole includes a plurality of perforation holes and the at least one insert protrusion includes a plurality of insert protrusions, and a first portion of each of the plurality of insert protrusions being connected to a first portion of at least one other insert protrusion.

4. The pouch-type battery cell according to claim 1, wherein the protruding end of the insert protrusion is bonded to an outer surface of the fixing tape.

5. A battery module, comprising at least one pouch-type battery cell according to claim 1.

6. A vehicle, comprising at least one pouch-type battery cell according to claim 1.

7. A pouch-type battery cell, comprising:
an electrode assembly having an electrode tab;
an electrode lead electrically connected to the electrode tab;
a pouch case having at least one perforation hole and at least one fixing protrusion extending from an inner surface of the pouch case, the at least one perforation hole defining a first through hole extending through the pouch case, the electrode assembly being disposed within the pouch case; and a lead film having a portion thereof interposed between the electrode lead and the inner surface of the pouch case, the lead film including at least one insert protrusion extending from an outer surface thereof and at least one second through hole to receive the at least one fixing protrusion such that the fixing protrusion contacts the electrode lead when received in the through hole of the lead film, wherein the lead film extends along the electrode lead from within the pouch case to an outside of the pouch case and the insert protrusion protrudes to the outside of the pouch case through the first through hole.

8. The pouch-type battery cell of claim 7, wherein the fixing protrusion is bonded to an inner surface of the second through hole of the lead film.

9. A pouch-type battery cell, comprising:
an electrode assembly having an electrode tab;
an electrode lead electrically connected to the electrode tab;
a pouch case having first and second perforation holes, the first and the second perforation holes extending through the pouch case, the electrode assembly being disposed within the pouch case, and
a lead film having a portion thereof interposed between the electrode lead and an inner surface of the pouch case, the lead film including first and second insert protrusions protruding to an outside of the pouch case through the first and the second perforation holes respectively such that the first and second insert protrusions are directly connected to each other on an outer surface of the pouch case,
wherein the lead film extends along the electrode lead from within the pouch case to the outside of the pouch case.

10. The pouch-type battery cell of claim 9, wherein the first and second insert protrusions are melted to contact each other on the outer surface of the pouch case.

* * * * *